United States Patent [19]
Lawson

[11] Patent Number: 4,562,697
[45] Date of Patent: Jan. 7, 1986

[54] INTERCOOLER FOR TURBOCHARGED INTERNAL COMBUSTION ENGINE

[75] Inventor: William Lawson, Fort Lauderdale, Fla.

[73] Assignee: Merlin Marine Engine Corp., Ft. Lauderdale, Fla.

[21] Appl. No.: 679,918

[22] Filed: Dec. 10, 1984

[51] Int. Cl.$^4$ .............................................. F02B 29/04
[52] U.S. Cl. ..................................... 60/599; 123/563; 165/159
[58] Field of Search .................. 165/158, 159; 60/599; 123/563

[56] References Cited

U.S. PATENT DOCUMENTS

| | | | |
|---|---|---|---|
| 1,842,945 | 1/1932 | Price et al. | 165/158 X |
| 2,318,834 | 5/1943 | Birkigt | 123/563 |
| 2,346,463 | 4/1944 | Szekely | 123/563 |
| 2,513,124 | 6/1950 | Weiks | 165/159 X |
| 2,595,457 | 5/1952 | Holm et al. | 165/159 X |
| 2,665,889 | 1/1954 | Huet | 165/159 X |
| 3,081,228 | 5/1963 | Maxwell | 123/119 |
| 4,191,148 | 3/1980 | Patel et al. | 123/119 CD |
| 4,385,496 | 5/1983 | Yamane | 123/563 X |

FOREIGN PATENT DOCUMENTS

| | | | |
|---|---|---|---|
| 657849 | 2/1963 | Canada | 165/157 |
| 948890 | 8/1949 | France | 165/159 |
| WO82/03270 | 9/1982 | PCT Int'l Appl. | 165/159 |
| 134724 | 3/1952 | Sweden | 165/159 |
| 664304 | 1/1952 | United Kingdom | 165/159 |
| 714911 | 9/1954 | United Kingdom | 165/159 |

OTHER PUBLICATIONS

"Engine Charge Air Cooler Nomenclature-SA-EJ1148", 1982 SAE Handbook (part 2), pp. 24.130–24.132.

*Primary Examiner*—Michael Koczo
*Assistant Examiner*—Randolph A. Smith
*Attorney, Agent, or Firm*—Oltman and Flynn

[57] ABSTRACT

An intercooler for a turbocharged internal combustion engine having a housing with opposite V-shaped side walls and a heat exchanger core inside the housing with straight pipes carrying heat conducting fins. The pipes pass a coolant lengthwise through the housing. Triangular spaces between the heat exchanger core and the respective V-shaped side walls of the housing cause a substantial equalization of the air flow across all of the fins, producing a more efficient heat transfer from the air to the coolant in the pipes.

14 Claims, 11 Drawing Figures

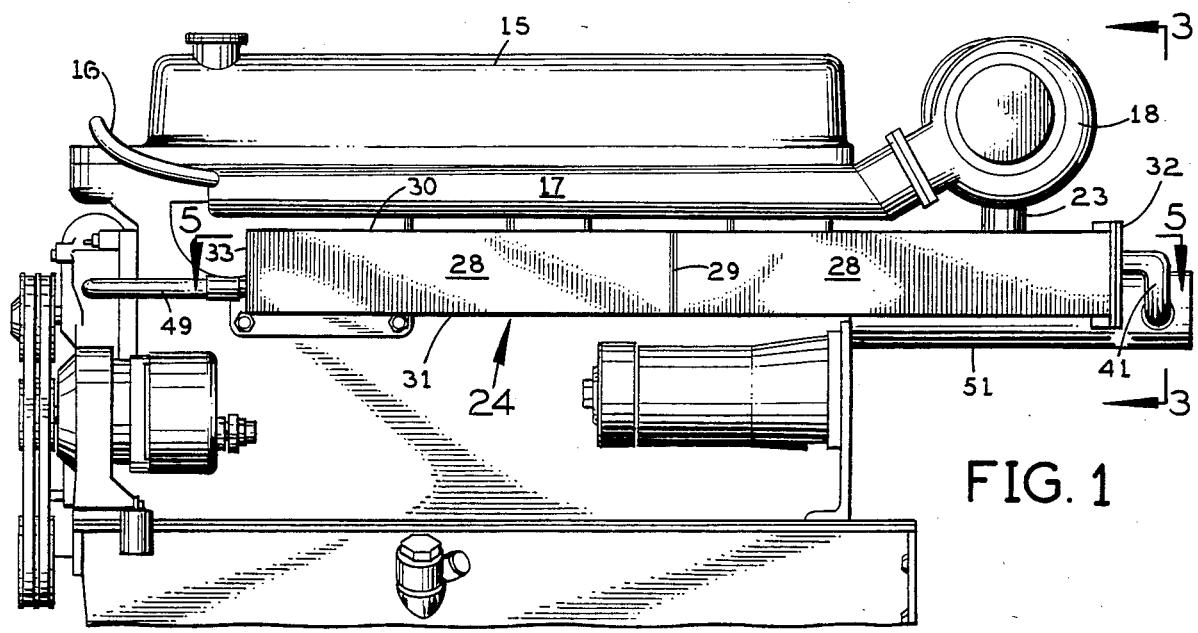
FIG. 1
FIG. 3
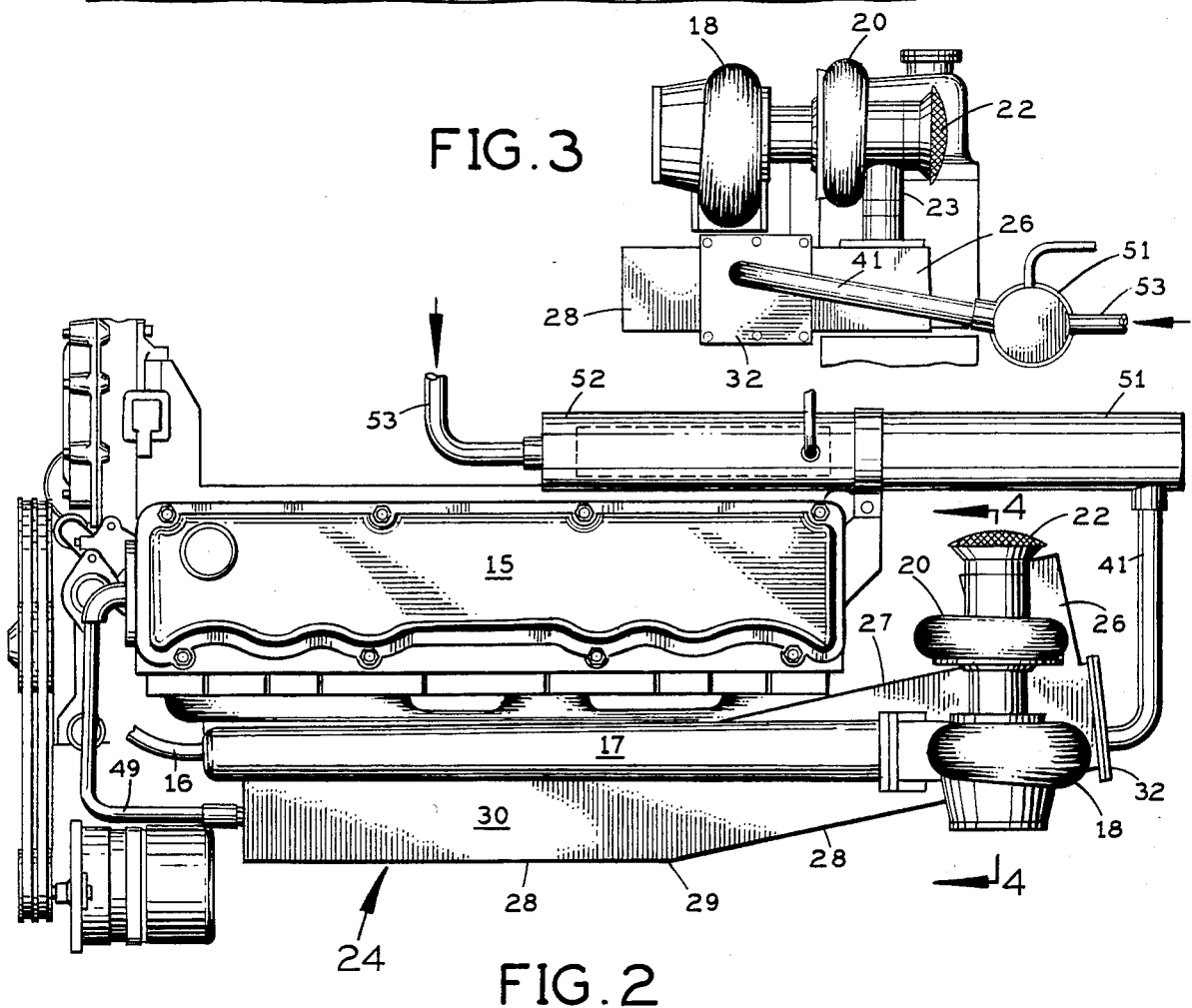
FIG. 2

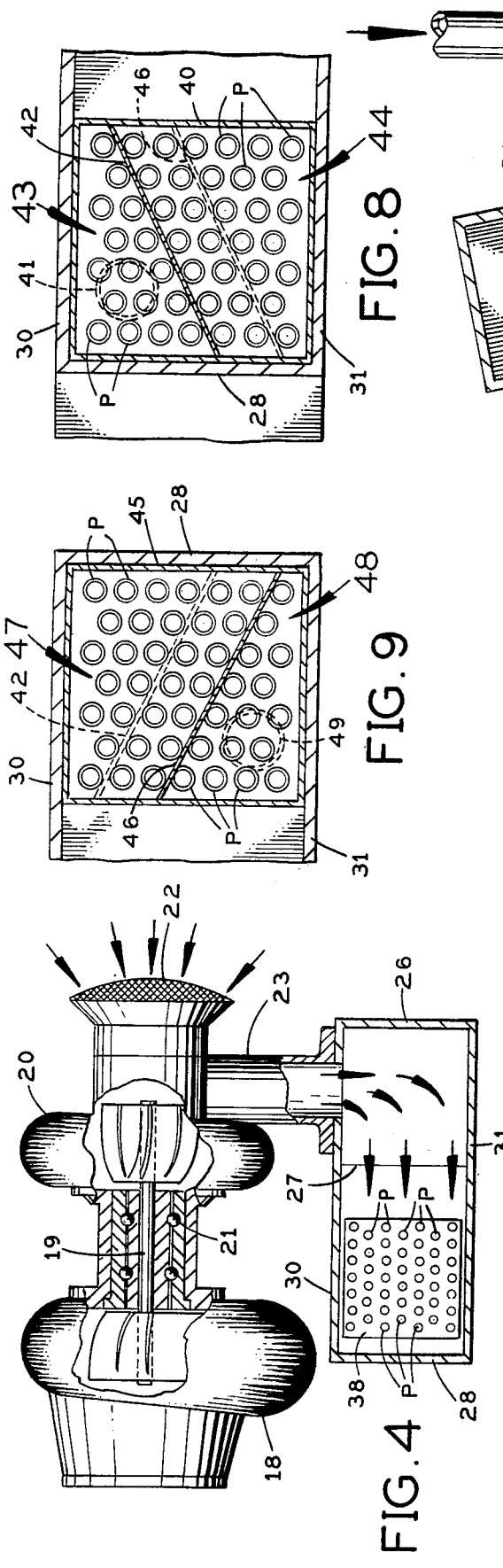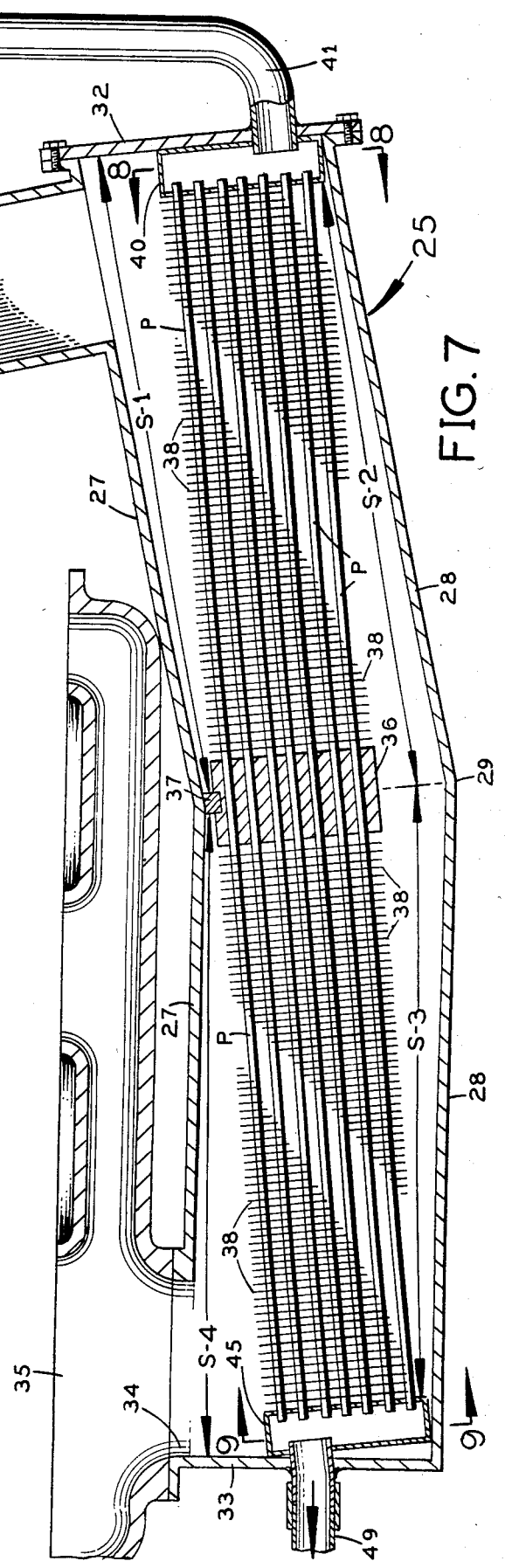

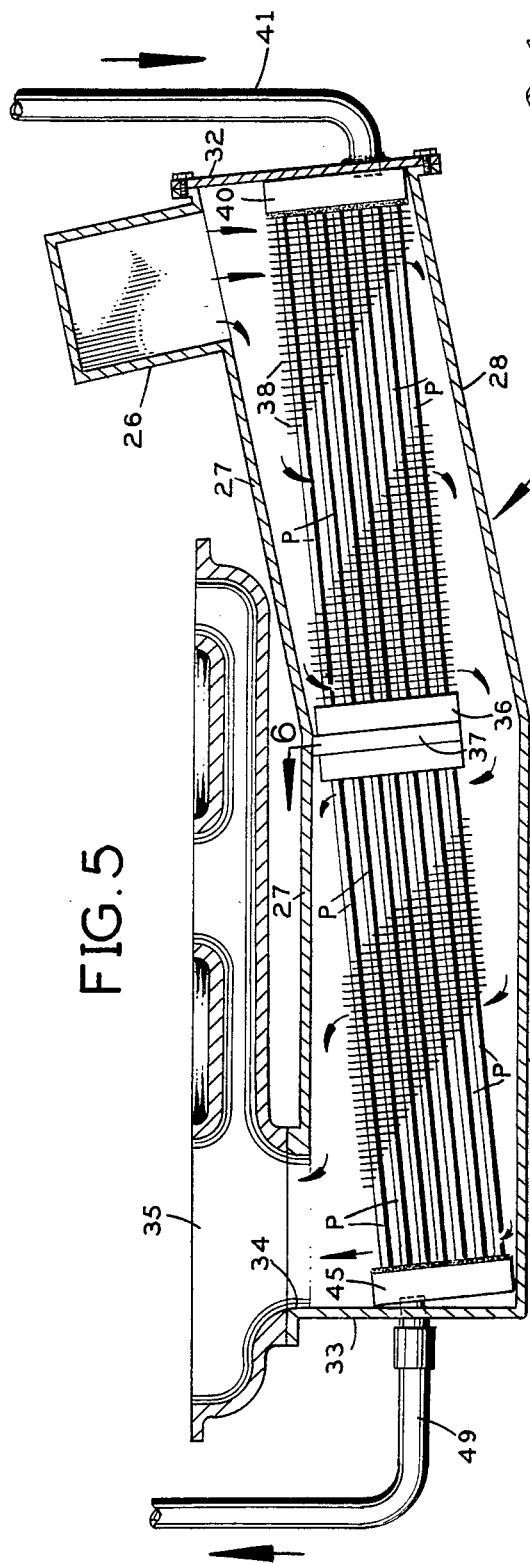
FIG. 5
FIG. 6
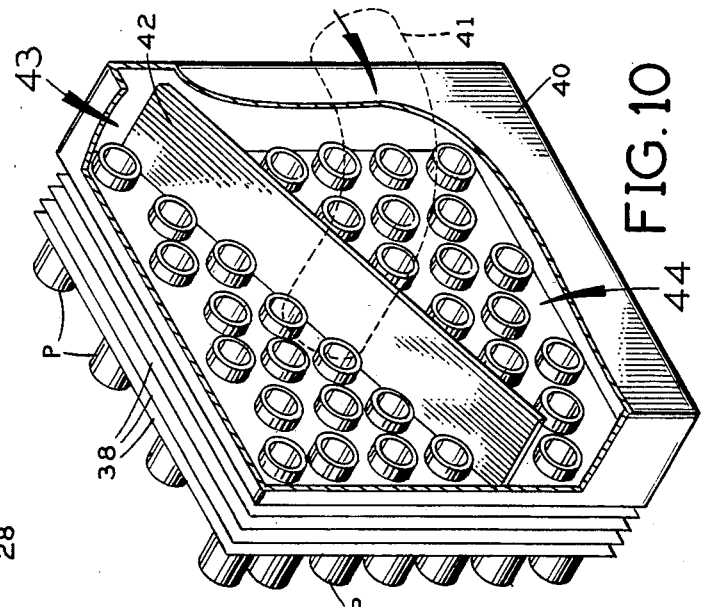
FIG. 10
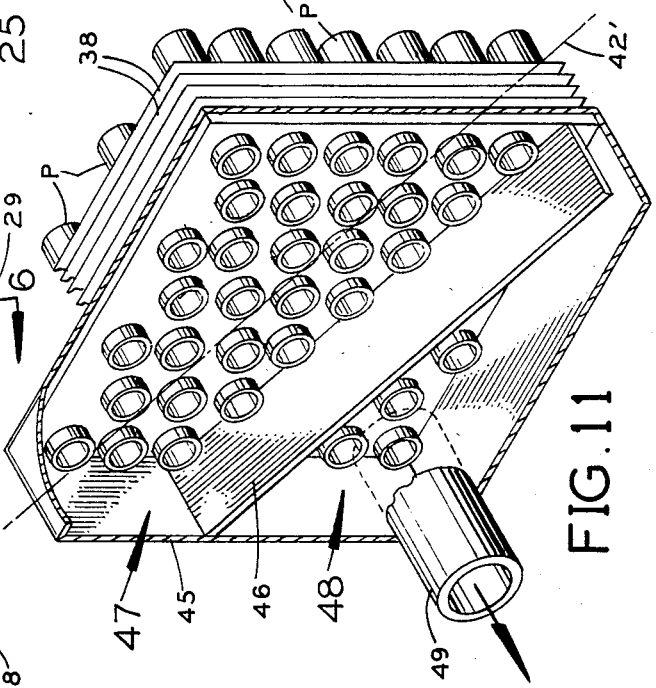
FIG. 11

INTERCOOLER FOR TURBOCHARGED INTERNAL COMBUSTION ENGINE

SUMMARY OF THE INVENTION

This invention relates to an intercooler for a turbocharged internal combustion engine to cool the air entering the engine intake manifold.

Various intercoolers for turbocharged engines, particularly diesel engines, have been proposed heretofore to cool the air entering the engine intake manifold, thereby increasing the amount of useful oxygen in a given volume of the intake air. The present invention is directed to an intercooler of novel construction which greatly improves the heat transfer between the coolant and the pressurized air coming from the turbocharger, thereby increasing the engine's output power and reducing the temperature of its exhaust.

In a presently preferred example the present intercooler is on a turbocharged marine diesel engine which uses sea water to cool its lubricating oil. The same sea water is then passed through finned pipes in the present intercooler to serve as a coolant for the intake air coming from the turbocharger. The sea water flows lengthwise through a straight, finned-tube core in the intercooler. The housing of the intercooler has opposite V-shaped walls, one of which engages the core midway along its length at the bend or apex of that wall and the other of which engages the core at its opposite ends. This leaves triangular spaces between these housing walls and the intercooler core which affect the air flow across the fins of the core such that all of the fins along the length of the core have a substantial flow of air across them. This produces a much more effective transfer of heat between the pressurized air coming from the turbocharger and the sea water coolant flowing through the finned pipes of the intercooler core. Consequently, the air is cooled to a temperature closely approaching that of the sea water coolant before it enters the engine intake manifold. Preferably, the sea water flows lengthwise through the core of the intercooler more than once to enhance the heat transfer between the coolant and the compressed air.

A principal object of this invention is to provide a novel intercooler for a turbocharged internal combustion engine.

Another object of this invention is to provide an intercooler of novel construction which greatly improves the heat transfer between the pressurized air coming from the turbocharger and the liquid coolant in the core of the intercooler.

Further objects and advantages of this invention will be apparent from the following detailed description of a presently preferred embodiment which is illustrated schematically in the accompanying drawings.

DESCRIPTION OF THE DRAWINGS

FIG. 1 is a side elevational view of a diesel engine equipped with a turbocharger and an intercooler in accordance with the present invention;

FIG. 2 is a top plan view;

FIG. 3 is an end elevation taken from the line 3—3 in FIG. 1;

FIG. 4 is a cross-section taken along the line 4—4 in FIG. 2 longitudinally through the engine intercooler;

FIG. 5 is a longitudinal section taken along the line 5—5 in FIG. 1 through the intercooler;

FIG. 6 is a cross-section taken along the line 6—6 in FIG. 5 midway along the intercooler;

FIG. 7 is a view generally similar to FIG. 5 with additional parts in section to show the flow paths for water in the intercooler;

FIG. 8 is a cross-section taken along the line 8—8 in FIG. 7 through the header at the water inlet end of the intercooler;

FIG. 9 is a cross-section taken along the line 9—9 in FIG. 7 through the header at the water outlet end of the intercooler;

FIG. 10 is a perspective view, with parts broken away for clarity, of the header at the water inlet end of the intercooler; and FIG. 11 is a similar view of the header at the water outlet end of the intercooler.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Referring to FIG. 1, a marine diesel engine 15 of known design has an exhaust pipe 16 leading into one end of an exhaust manifold 17 whose opposite end leads into the inlet side of a rotary turbine 18 in a turbocharger of known design. The outlet side of this turbine is vented to the atmosphere. As shown in FIG. 4, the turbine 18 has a rotary output shaft 19 which is also the drive shaft of an air compressor 20 of known design. Between the housing of turbine 18 and the housing of air compressor 20 the shaft is rotatably supported by a ball bearing assembly indicated generally by the reference numeral 21. The air compressor 20 has an air intake covered by a screen 22 on the side of the compressor housing away from the housing of turbine 18. Air compressor 20 has an air outlet leading to a downwardly extending discharge pipe 23 mounted on top of an air-water heat exchange intercooler 24 in accordance with the present invention.

The intercooler has a housing 25 which, as shown in FIG. 6, is rectangular in cross-section for almost its entire length. However, at the right end in FIG. 4 the intercooler housing has a lateral offset or branch 26 where the air enters from pipe 23 coming down from the air compressor 20 above. Except at this lateral offset 26, the intercooler housing presents opposite vertical side walls 27 and 28, each of which has a shallow V-shape from end to end. These opposite V-shaped side walls are evenly spaced apart along the length of the intercooler. The apex of the "V" is located midway along the intercooler housing, as shown at 29 in FIGS. 1 and 2. This is where the cross-sectional view of FIG. 6 is taken. The intercooler housing has a flat top wall 30 and a flat bottom wall 31, both extending between the V-shaped opposite side walls 27 and 28. At the right end in FIGS. 5 and 7 the intercooler is closed by a bolted-on end plate 32. At the left end in these Figures the intercooler housing presents an end wall 33. Next to end wall 33 the inner side wall 27 of the intercooler housing has an opening 34 which leads into the intake manifold 35 of the diesel engine 15.

The intercooler core has a plurality of straight, cylindrical water pipes P extending lengthwise inside the intercooler housing. These pipes are physically supported at the apex or bend in the intercooler housing by a rigid block 36 of rectangular cross-section which is formed with openings which snugly receive the water pipes individually. This block has a seal strip 37 on three sides which, as shown in FIG. 6, sealingly engages the inner side wall 27 and the top and bottom walls 30 and 31 of the intercooler housing.

Except at this block the pipes P carry thin, flat heat exchange fins or plates 38 which improve the transfer of heat from the air outside the pipes to the sea water inside the pipes.

In the particular embodiment shown there are seven vertical columns of the water pipes, with the pipes in neighboring columns offset vertically, as shown in FIGS. 6 and 8, to form diagonal rows.

The right ends of the pipes in FIGS. 5 and 7 extend into a rectangular, box-like header 40. Sea water enters this header through pipe 41 above a diagonal divider wall 42 (FIGS. 8 and 10), which divides the interior of header 40 into an upper chamber 43 and a lower chamber 44. As shown in FIG. 8, sixteen of the upper pipes P (above the divider wall 42) open into the upper chamber 43 to receive sea water coming in through pipe 41. These sixteen pipes are: the top four in the left-hand vertical column, the top three in each of the next two columns to the right, the top two in each of the next two columns farther to the right, and the top pipe in each of the two columns at the right side. The incoming sea water flows through these sixteen pipes from right to left in FIGS. 5 and 7 into a header 45 at the opposite end of the intercooler housing.

As shown in FIGS. 9 and 11, header 45 is a rectangular, box-like structure with a diagonal divider wall 46, which separates an upper header chamber 47 from a lower chamber 48. Divider wall 46 extends parallel to and at a lower diagonal level than the divider wall 42 in header 40 at the opposite end of the pipes. The projection of divider wall 42 is shown in phantom at 42' in FIG. 11. Sixteen lower pipes P (which collectively are a reverse image of the sixteen upper pipes which open into the upper chamber 43 of header 40) open into the lower chamber 48 of header 45. Fourteen pipes (two in each vertical column) at one end open into the lower chamber 44 of header 40 and at the opposite end into the upper chamber 47 of header 45. These fourteen pipes form two diagonal rows of pipes which open into the upper chamber 47 of header 45 in addition to the same sixteen upper pipes which open into the upper chamber 43 of header 40.

The sea water, which flows from right to left in FIGS. 5 and 7 through the sixteen pipes which open into header chamber 43, upon reaching the upper chamber 47 of the header 45 now flows from left to right through the next two diagonal rows of pipes down from the sixteen which received sea water from the upper chamber 43 of header 40. These two diagonal rows of pipes (immediately above divider wall 46 in header 45) open into the lower chamber 44 in header 40 at the right end of the intercooler in FIGS. 5 and 7. From here, the sea water again flows from right to left through the remaining sixteen lower pipes which open into the lower chamber 44 of header 40 and open into the lower chamber 48 of header 45 (below the divider wall 46). From manifold chamber 48 the sea water passes through an outlet pipe 49 leading to the inlet of a water pump (not shown).

With this arrangement, the incoming sea water flows three times lengthwise through the intercooler: first, from right to left through the sixteen pipes connecting the upper chamber 43 of header 40 to the upper chamber 47 of header 45; second, from left to right through the fourteen pipes connecting the upper chamber 47 of header 45 to the lower chamber 44 of header 40; and third, from right to left through the sixteen lower pipes connecting the lower chamber 44 of header 40 to the lower chamber 48 of header 45.

As shown in FIG. 8, the header 40 at the right end fills the interior of the intercooler housing from top to bottom next to the V-shaped outer side wall 28. Similarly, as shown in FIG. 9, the header 45 at the left end fills the interior of the intercooler from top to bottom next to the V-shaped outer side wall 28. Between these headers the outer side wall 28 of the intercooler housing diverges from the assembly of pipes P and fins 38, reaching a maximum distance from them at the apex 29 of this side wall midway along the length of the pipes. At this midpoint, as shown in FIG. 6, the block 36 which holds the pipes P engages the opposite (inner) side wall 27 of the intercooler housing and fills the interior of this housing from top to bottom. In each longitudinal direction away from block 36 the inner side wall 27 of the intercooler housing diverges from the assembly of pipes P and fins 38.

The heat transfer fins or plates 38 on the pipes P preferably have a rectangular shape the same as that of the headers 40 and 45, so that each fin 38 fills the interior of the intercooler housing from top to bottom, i.e., between top wall 30 and bottom wall 31. Consequently, the air flowing through the intercooler must pass between the neighboring fins 38 and cannot pass around the edges of these fins. This maximizes the heat exchange between the air and these fins because air sweeps across the entire flat surface on each major face of each fin 38.

Referring to FIG. 7, the pressurized air entering the intercooler housing at 26 first encounters a first triangular space S-1 between the inner side wall 27 of the intercooler housing and the heat exchanger core consisting of the fins 38 and pipes P. This space is progressively narrower from the end plate 32 to the midpoint where support block 36 is located.

From this first triangular space S-1 the air flows between the fins and across the pipes to a second triangular space S-2 on the opposite side, between the pipe-and-fin heat exchange core and the outer side wall 28 of the intercooler housing, which is narrowest next to the inlet manifold 40 and progressively wider toward the apex 29 of the outer side wall 28. Thus, lengthwise of the intercooler, the second triangular space S-2 is virtually a mirror image of the first triangular space S-1.

On the opposite side of the apex 29, a third triangular space S-3 is formed between the outer side wall 28 of the intercooler housing and the pipe-and-fin heat exchanger core. This space S-3 is a continuation of space S-2 and is a mirror image of it, becoming progressively narrower from the apex 29 toward the header 45.

From this space S-3 the air flows between the fins 38 and across the pipes P to a fourth triangular space S-4 located between the fin-and-pipe heat exchanger core and the inner side wall 27 of the intercooler housing. Space S-4 is narrowest next to the support block 36 and becomes progressively larger toward the end wall 33 of the intercooler housing.

I have discovered that this novel arrangement of the fin-and-pipe heat exchanger core and the intercooler housing produces a much more effective heat exchange action because of a more uniform flow of air across the fins throughout the length of the heat exchanger assembly. This can be determined by removing the fin-and-pipe heat exchanger core from the intercooler housing and observing the discoloration of the fins caused by air flowing across them. In my intercooler this discoloration is substantially the same for all the fins. In contrast, in prior intercoolers which I have inspected there has been a strong discoloration or blackening of only those fins which are at certain locations and virtually no discoloration of the others, indicating that practically all of the air flow was localized at the fins which were most discolored.

I do not fully understand why these greatly improved air flow characteristics take place except that I have determined that they are obtained as a result of the novel physical arrangement of the fin-and-pipe heat exchanger and the intercooler housing, as disclosed herein.

Referring to FIG. 2, the pipe 41 which passes sea water into the heat exchanger manifold 40 receives it from a conduit or chamber 51 on the outlet side of a heat exchanger 52 which receives water through inlet pipe 53 directly from the sea or other body of water where the boat is located. In heat exchanger 52, the incoming sea water is used to cool the recirculating lubricating oil supply for the marine engine. The temperature of the sea water going into the sea water-air intercooler typically is more than 300 degrees below the temperature of the compressed air entering the intercooler at 26.

In one practical embodiment, the present intercooler is 33 inches long, the fins 38 are 3.75 inches square and are of 0.006 inch thick semi-hard copper, and the pipes P are of cupronickel about 0.020 inch thick with an outside diameter of about ⅜ inch. I have used this intercooler on a 363 cubic inch, six cylinder diesel engine which when equipped with two intercoolers of previous design could achieve a maximum of 284 shaft horsepower, with an exhaust temperature of about 1250 degrees F., which is too high for long term operation of the engine.

After replacing the two prior intercoolers with the present intercooler, for the same fuel consumption the shaft horsepower was increased to 340 and the exhaust temperature was reduced to 900 degrees F. The engine exhaust was clean and, of course, the engine ran cooler.

In the present intercooler the heat exchange between the sea water and the air is so efficient that the temperature of the air leaving the intercooler and going into the engine intake manifold 35 is only about 10 degrees F. higher than the temperature of the sea water coolant entering the intercooler at the inlet header 40. Typically, the air enters the intercooler at a pressure of 30 psi above atmospheric and at a temperature of about 400 degrees F., and it leaves the intercooler at a temperature of about 110 degrees F.

If desired, the core of the present intercooler may be constructed to provide less or more lengthwise flows of the coolant, than the three passes provided by the specific embodiment shown in the drawings. For example, the coolant may flow just once lengthwise in one direction through all of the pipes P in the intercooler core, or the coolant may flow lengthwise in one direction through half the pipes and return in the opposite direction through the remaining pipes in the intercooler for a total of two passes, or the coolant may flow in successive opposite directions four times or more through different pipes of the intercooler. Internal baffles in the headers 40 and 45 at the opposite ends of the core would determine the flow path of the coolant, except that if the coolant is to flow just once through all of the pipes there should be no internal baffles in these headers.

Also it is to be understood that the present intercooler may be used on an internal combustion engine other than a diesel engine, such as a conventional gasoline engine of the general type still used on most passenger automobiles.

Likewise, the coolant may be other than sea water, such as the coolant typically used in passenger car engines.

I claim:
1. An intercooler for an internal combustion engine having an intake manifold and a turbocharger which delivers pressurized air, said intercooler comprising:
   a heat exchanger core having:
      (a) a plurality of elongated, substantially straight pipes for conducting a coolant,
      (b) means for passing the coolant through the pipes of the core, and
      (c) a plurality of heat conducting fins on said pipes extending transverse to the pipes closely spaced apart along the pipes to define passages for air across the pipes;
   a housing enclosing said heat exchanger core and having:
      (a) a first side wall on one side of the core extending next to the core at an intermediate point along the length of the core and diverging laterally from the core in each direction along the core from said intermediate point,
      (b) a second side wall on the opposite side of the core from said first side wall, said second side wall extending next to said core at each end and diverging laterally from the core from each end to said intermediate point and
      (c) additional walls closely confining the core from said first side wall to said second side wall to form
         a first space between said first side wall and the core from one end of the core to said intermediate point along the core,
         second and third, adjoining spaces between the core and said second side wall from one end of the core to its opposite end, and
         a fourth space between the core and said first side wall from said intermediate point to said opposite end of the core;
   means for introducing pressurized air from the turbocharger into said first space;
   and means for passing air from said fourth space into the engine intake manifold after the air flows from said first space across the core between the fins into said second space, and from said second space into said third space, and from said third space back across the core between the fins into said fourth space.

2. An intercooler according to claim 1 wherein said first and second side walls of the housing are both generally V-shaped lengthwise of the core and extend generally parallel to each other.

3. An intercooler according to claim 1 wherein:
   said first side wall extends next to the core substantially midway along the length of the core;

and said second wall is spaced farthest from the core substantially midway along the length of the core.

4. An intercooler according to claim 3 and further comprising:
a support member holding said pipes substantially midway along the length of the core and sealingly engaging said first side wall and said additional walls of the housing to separate said first and fourth spaces on said one side of the core.

5. An intercooler according to claim 4 and further comprising:
an inlet header at one end of the core having separate first and second chambers;
and an outlet header at the opposite end of the core having separate first and second chambers;
and wherein said pipes in the heat exchanger core comprise:
a first plurality of pipes extending from said first chamber of the inlet header to said first chamber of the outlet header to pass the coolant in one direction lengthwise through the core;
a second plurality of pipes extending from said first chamber of the outlet header to said second chamber of the inlet header to pass the coolant lengthwise in the opposite direction through the core;
and a third plurality of pipes extending from said second chamber of the inlet header to said second chamber of the outlet head to pass the coolant again in said one direction lengthwise through the core.

6. An intercooler according to claim 1 and further comprising:
an inlet header at one end of the core having separate first and second chambers;
and an outlet header at the opposite end of the core having separate first and second chambers;
and wherein said pipes in the heat exchanger core comprise:
a first plurality of pipes extending from said first chamber of the inlet header to said first chamber of the outlet header to pass the coolant in one direction lengthwise through the core;
a second plurality of pipes extending from said first chamber of the outlet header to said second chamber of the inlet header to pass the coolant lengthwise in the opposite direction through the core;
and a third plurality of pipes extending from said second chamber of the inlet header to said second chamber of the outlet header to pass the coolant again in said one direction lengthwise through the core.

7. An intercooler according to claim 1 and further comprising:
a support member holding said pipes at said intermediate point along the core and sealingly engaging said first side wall and said additional walls of the housing to separate said first and fourth spaces on said one side of the core.

8. An intercooler according to claim 7 wherein said first and second side walls of the housing are both generally V-shaped lengthwise of the core and extend substantially parallel to each other.

9. An intercooler according to claim 8 wherein:
said first side wall extends next to the core substantially midway along the length of the core;
and said second side wall is spaced farthest from the core substantially midway along the length of the core.

10. An intercooler for an internal combustion engine having an air intake manifold and a turbocharger which delivers pressurized air, said intercooler comprising:
a heat exchanger core having a plurality of elongated pipes for conducting a coolant between opposite ends of the core, and a plurality of heat conducting fins on said pipes extending transverse to the pipes closely spaced apart along the pipes to define passages for air across the pipes;
a housing enclosing said heat exchanger core and forming therewith:
(a) a first space on one side of the core extending between one end of the core and an intermediate point between the ends of the core, said first space having a progressively smaller cross-section from said one end of the core toward said intermediate point;
(b) a second space on the opposite side of the core extending between said one end and said intermediate point and of progressively larger cross-section from said one end toward said intermediate point;
(c) a third space on said opposite side of the core which opens into said second space at said intermediate point and extends therefrom to the opposite end of the core with a progressively smaller cross-section toward said opposite end; and
(d) a fourth space on said one side of the core separated from said first space and extending from said intermediate point to said opposite end of the core with a progressively larger cross-section toward said opposite end;
means for introducing pressurized air from the turbocharger into said first space;
and means for passing air from said fourth space into the engine intake manifold after the air flows from said first space across the core between the fins into said second space, and from said second space into said third space, and from said third space back across the core between said fins into said fourth space.

11. An intercooler according to claim 10 and further comprising:
respective headers in fluid communication with the pipes at the opposite ends of the core for passing the coolant.

12. An intercooler according to claim 10 and further comprising:
a support member holding said pipes at said intermediate point along the core and sealingly engaging the inside of the housing to separate said first and fourth spaces on one said side of the core.

13. An intercooler according to claim 12 wherein said intermediate point is substantially midway along the length of the core.

14. An intercooler according to claim 13 wherein said housing on said opposite sides of the core has opposite walls which are substantially V-shaped lengthwise of the core and extend substantially parallel to each other.

* * * * *